United States Patent [19]

Sechet et al.

[11] 4,354,201

[45] Oct. 12, 1982

[54] TELEVISION SYSTEM WITH ACCESS CONTROL

[75] Inventors: Claude Sechet, Rennes, France; Gerard Babonneau, 14, rue Théodore Botrel, 35830 Betton, France; Louis C. Guillou, Saint Erblon, France

[73] Assignees: Etablissement Public de Diffusion Dit: Telediffusion de France, Montrouge; Gérard Babonneau, Betton, both of France

[21] Appl. No.: 158,499

[22] Filed: Jun. 11, 1980

[30] Foreign Application Priority Data

Jun. 15, 1979 [FR] France ............................ 79 15400

[51] Int. Cl.³ ..................... H04N 7/16; H04K 1/04
[52] U.S. Cl. ............................. 358/122; 358/114; 358/345; 358/347
[58] Field of Search ............. 358/114, 122, 86, 345, 358/347

[56] References Cited

U.S. PATENT DOCUMENTS

| | | | |
|---|---|---|---|
| 3,538,243 | 11/1970 | Shanahan et al. | 358/124 |
| 3,934,079 | 1/1976 | Barnhart | 358/86 |
| 3,956,615 | 5/1976 | Anderson et al. | 340/152 R |
| 3,997,718 | 12/1976 | Ricketts | 455/2 |
| 4,025,948 | 5/1977 | Loshin | 358/122 |
| 4,045,814 | 8/1977 | Hartung et al. | 358/124 |
| 4,081,832 | 3/1978 | Sherman | 358/122 |
| 4,214,230 | 7/1980 | Fak et al. | 340/149 A |

*Primary Examiner*—S. C. Buczinski

[57] ABSTRACT

A television system with access control comprises a transmitter and receivers. The transmitter comprises a video signal and sound signal formation circuit, means for transmitting these signals and a jamming circuit using a service key. Each receiver comprises means for receiving the transmitted signals, means for the display of the picture and for restoring the sound and an unjamming circuit connected to the reception means and working with the service key.

It also comprises a subscription management center and in the transmitter a digital signal generator, a circuit for the formation of digital messages and a data broadcasting system and in the receiver a subscription card, an extraction circuit for the data, and a circuit for restoring the service key. There is also at least one subscription card loading station connected to the subscription management center.

5 Claims, 5 Drawing Figures

TELEVISION SYSTEM WITH ACCESS CONTROL

BACKGROUND OF THE INVENTION

The present invention relates to a television system with access control using a variable electronic key.

The problem of access control of broadcast information mainly consists of the jamming of information on transmission by means of an appropriate key, as well as unjamming or deciphering on reception by means of an identical key, which is only in possession of users who have regularly paid a subscription fee.

Numerous television systems are already known which are equipped with jamming means on transmission and unjamming means on reception. Such systems are more particularly described in French Pat. No. 106 670, German Pat. No. 1 907 580, French Patent Application No. 75 34029 filed on Nov. 3, 1975 in the joint name of the French State and Telediffusion de France, French Pat. No. 1 034 776, German Pat. No. 1 254 676 and U.S. Pat. Nos. 2,510,046, 2,619,530, 2,892,882 and 2,972,009.

The jamming processes used in these systems are based on the introduction of a displacement of the position of the line synchronization pulse on a periodic reversal of the complete signal and on the polarity change of the video signal or on a combination of these operations. In all these processes it is necessary for the receivers to receive in some way or the other signals making it possible to restore the key necessary for covering the clear information.

The present invention relates to a television system of this type, but in which the key which permits unjamming is transmitted to the receivers in an original and advantageous manner.

In the prior art systems the transmission of this key does not give entire satisfaction because it is not generally compatible with the recently developed digital services and which are being or will be offered to viewers. They consist more particularly of three systems: a system for digital acquisition and television display of pictures organised in writing pages, a system for interactive terminal for teletext with call-in by numbering, and a system for programmed recording of transmissions on command from the sources.

The first system consists of a broadcast videotex system making it possible to insert alphanumeric information organized in pages and in magazines on television channels. The second comprises an interactive videotex system compatible with the first system and giving access to data bases (general information, lists, etc.) and to interactive services (transactions, messages, instruction) by the telephone system. The third system is a programme message system consisting of offering by means of a data broadcasting channel the remote control from a transmission source of the recording action by a receiver (e.g. a magnetoscope) of a preselected television programme.

For broadcasting information these three systems use means and a process of broadcasting of digital data, which is compatible with the broadcasting of the television signal.

BRIEF SUMMARY OF THE INVENTION

The present invention relates to an access control means having a complete compatibility with these different systems.

To this end the system according to the invention has two essential features:

(1) In the first place it uses a double key system, namely with a service key K making it possible to jam information and which changes in a random manner at relatively short intervals of approximately a few minutes, and a subscription key which can assume several values $C_i$ depending on the type of subscription, said key also changes in a random manner but at longer intervals of approximately one month. This subscription key appears on a subscription card introduced into each receiver. The two keys K and $C_i$ are combined on transmission for forming messages $M_i$.

(2) Secondly the messages $M_i$ and not the actual service key K are transmitted from the transmitter to the receivers. This transmission takes place in accordance with the aforementioned digital data broadcasting process, which gives the system compatibility with all digital services based on this procedure. On reception the messages $M_i$ received are combined by the subscription key $C_i$ supplied by a subscription card, making it possible to restore the key K necessary for unjamming the signal received.

More specifically the present invention relates to a television system provided with access control means and which comprises a transmitter and receivers, transmitter comprising a formation circuit for a videosignal organized in lines and in fields and a sound circuit, as well as a transmission means for said signals, each receiver comprising a reception means for the transmitted signals and means for the visual display of the picture and the restoration of the sound, wherein it also comprises:

(A) a subscription management centre comprising the means for generating a plurality of digital signals constituting subscription keys $C_i$ changing in random manner at relatively long intervals of approximately one month;

(B) a transmitter comprising:

(a) a digital signal generator constituting a service key K, said key changing in random manner at relatively short intervals of approximately a few minutes, (b) a circuit for the formation of digital messages $M_i$ obtained from the subscription keys $C_i$ and the service key K by an algorithm parametered by the subscription key, i.e. $M_i = F_{C_i}(K)$, said circuit supplying the same number of messages as there are subscription keys, said messages changing with the service key, (c) a system for broadcasting digital data able to insert messages $M_i$ in the field blanking intervals of the video signal, (d) a jamming circuit using the service key K, said jamming circuit receiving the video and/or sound signal and supplying jammed video and/or sound signals which are then transmitted to the transmission means, said jamming not affecting the messages contained in the field blanking intervals;

(C) in each receiver are provided:

(a) a subscription card on which is entered a signal corresponding to at least one of the subscription keys $C_i$, (b) a circuit for the extraction of the digital data contained in the signal received, said circuit restoring the messages $M_i$, (c) a circuit for restoring the service key receiving on the one hand messages supplied by the preceding circuit and on the other the subscription key $C_i$ supplied by the subscription card, said circuit performing an algorithm $K = G_{C_i}(M_i)$ making it possible to restore the signal corresponding to the service key K used in the transmitter, (d) an unjamming circuit connected on the one hand to the reception means from where it receives the jammed video and optionally sound signals and on the other hand to the restoration circuit from where it receives the service key K, said unjamming circuit supplying unjammed video and optionally sound signals which are then transmitted to the means for the display of the picture and the restoration of sound;

(D) at least one subscription card loading station, which is connected to the subscription management centre from which it receives signals corresponding to the different subscription keys $C_i$ generated by the said centre, each station being able to temporarily receive subscription cards and write therein one of the subscription keys $C_i$.

Preferably the jamming circuit comprises a pseudo-random sequence generator re-initialized at the start of each field by the service key K and supplying a digital jamming signal at the start of each line, and a video and optionally sound signal conversion circuit, the conversion being carried out by this circuit being defined by the digital signal supplied by the pseudo-random sequence generator.

In this case the unjamming circuit comprises a pseudo-random sequence generator identical to that of the jamming circuit and in the same way re-initialized at the start of each field by the service key K and supplying an unjamming digital signal at the start of each line and a circuit able to carry out the reverse conversion to that of the jamming circuit on the video and optionally sound signal, said conversion being determined by the digital unjamming signal supplied by the pseudo-random sequence generator.

The jamming operation on transmission can be of any known type and particularly in accordance with the processes described in the documents referred to hereinbefore. However, according to an advantageous variant a means based on a circular permutation of the samples to be jammed is used.

Naturally the jamming operation can affect both the picture and the sound. With regard to the transmission of sound it can be carried out either by an ordinary sound channel, or a digital channel using the field blanking intervals and operating in accordance with the digital data broadcasting procedure, or a digital channel using the line blanking intervals, or a digital channel using supplementary signals inserted in the chrominance colour bursts.

The means used for the transmission of sound can be marked by means of bits forming part of the service key K.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
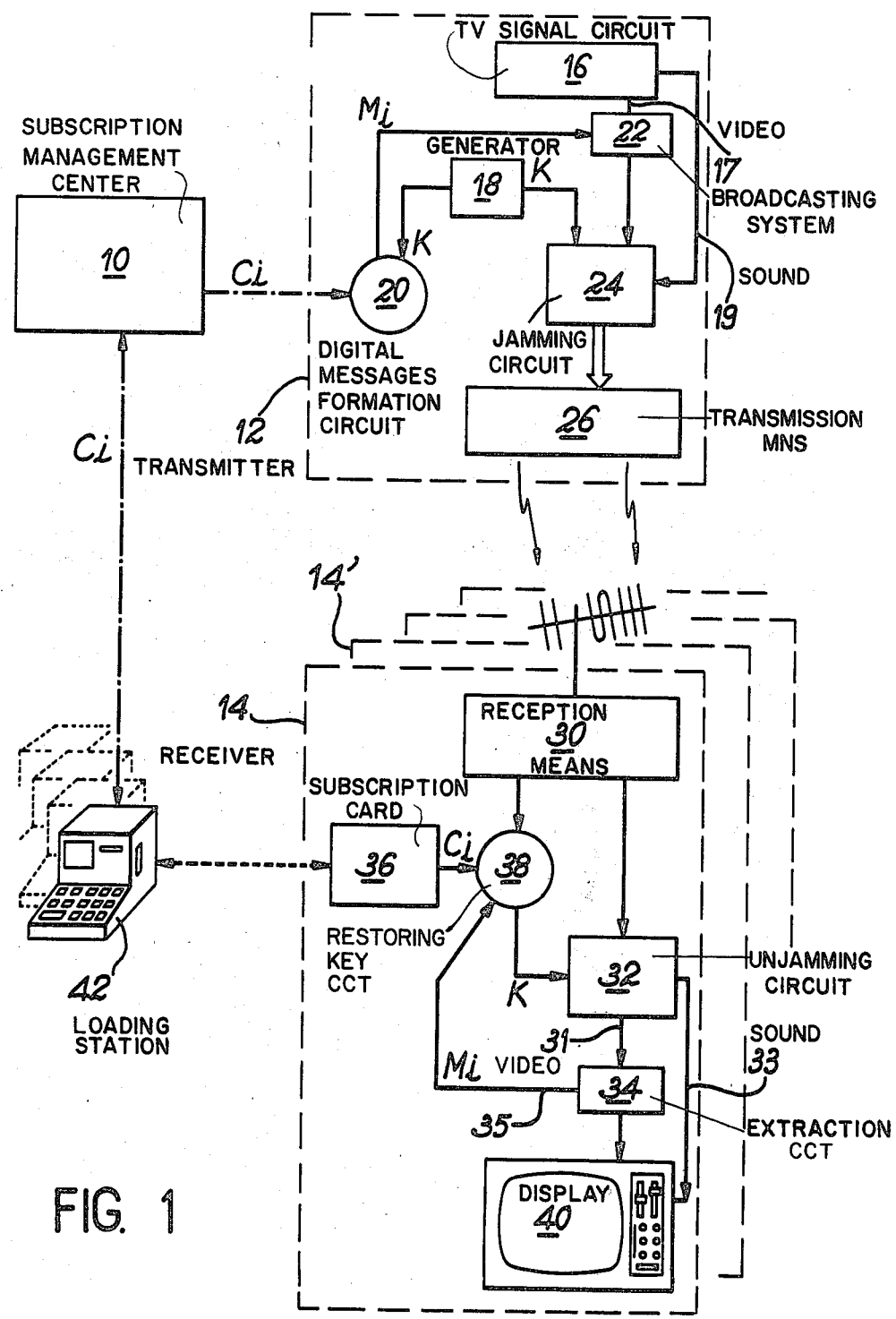
FIG. 1—a block diagram of a television system with access control according to the invention.

The system shown in FIG. 1 firstly comprises a subscription management centre 10 which generates a plurality of signals constituting subscription keys $C_i$, which change in a random manner at relatively long intervals of approximately one month.

The actual television system is organized around the transmitter 12 and has a plurality of receivers 14.

Transmitter 12 comprises:

(a) a circuit 16 for the formation of television signals incorporating a part relative to a videosignal carried by a connection 17 and a part relative to the sound carried by a connection 19;

(b) a generator 18 of a signal constituting a service key K, said key changing in a random manner at relatively short intervals of approximately a few minutes;

(c) a circuit 20 for the formation of digital messages $M_i$ from subscription key $C_i$ generated by centre 10 and the service key K generated by generator 18, for which purpose the circuit 20 performs an algorithm parametered by the subscription keys, i.e. $M_i = F_{C_i}(K)$, and supplies the same number of messages $M_i$ as there are subscription keys, said messages changing with the service key K;

(d) a digital data broadcasting system 22 able to insert messages $M_i$ into the field blanking intervals of the videosignal coming from circuit 16 by means of connection 17;

(e) a jamming circuit 24 using the service key K for jamming the video and/or sound signal, said jamming not affecting the messages $M_i$ contained in the field blanking intervals, the jammed signal supplied by this circuit are then transmitted to the transmission means 26.

Each receiver 14 of the present system contains:

(a) a broadcast signal reception means 30;

(b) an unjamming circuit 32 connected to the reception means 30 from which it receives the jammed video and optionally sound signals and which operates by means of the service key K, supplying the unjammed video and sound signals respectively carried by connections 31 and 33;

(c) a circuit 34 for the extraction of digital data contained in the video signal received, said circuit restoring messages $M_i$ by a connection 35;

(d) a subscription card 36 on which is entered a signal corresponding to at least one of the subscription keys $C_i$;

(e) a circuit 38 for restoring the service key K from messages $M_i$ supplied by the circuit 34 and the subscription key $C_i$ supplied by the subscription card 36, said circuit 38 performing an algorithm $K = G_{C_i}(M_i)$ making it possible to restore the signal corresponding to the service key K used in the transmitter, said key then being addressed to the unjamming circuit 32;

(f) means 40 for the display of the pictures and the restoration of sound.

The system shown also has at least one loading station 42 suitable for the subscription card 36. This station is connected to the subscription management centre 10 from which it receives signals corresponding to the different subscription keys $C_i$ generated by the centre. Each station 42 is temporarily able to receive the subscription cards and to write therein in a lasting manner (e.g. in a memory) one of the subscription keys $C_i$.

For the purpose of illustrating the operation of this double key system it is possible to take the example of a subscription scheme using four types of subscriptions, i.e. one month, three months, six months and one year. In addition to its duration a subscription is characterized by the starting month. In the case of such a scheme for a given month and for a given service there are consequently 22 subscription keys which are likely to be used by users, namely one monthly key, three quarter-yearly keys, six half-yearly keys and twelve yearly keys.

Every month the subscription management centre 10 supplies transmitter 12 with a list of 22 subscription keys $C_i$ for each service broadcast by this transmitter. In addition, it supplies loading stations 42 with another list of four keys for starting the following month (one month, three months, six months and one year), for each service with the subscription rates.

A suitable machine installed at each point of sale enters certain of these keys in the form of subscription blocks on the cards 36. A subscription block can for example consist of four fields:

(1) a service code having 16 bits designating the service in question;

(2) a subscription symbol of 8 bits having which characterizes the subscription for a service in question, whereby 2 of said bits indicate the subscription type (1, 3, 6 or 12 months) and the 6 others indicate the subscription starting month (1 to 60 modulo 5 years);

(3) a subscription key of 128 bits which is the fundamental information of the block;

(4) a cyclic redundancy code of 16 bits and relates to the preceding 152 bits and makes it possible to check the subscription block before using the same.

Thus, a subscription block is formed by 168 bits, i.e. 21 octets. Such a block can easily be entered in a credit card-type support provided with a PROM memory (Programmable Read-Only Memory) with a capacity of 4096 bits usable for this purpose. Such a card can receive up to 24 subscription blocks having the indicated characteristics.

For each paying service, approximately every five minutes, a new service key K is generated in a random manner in the transmitter. Thus, during a session of a service (one or several hours) a few dozen service keys can follow one another. As soon as a transmitter generates a new service key K it calculates for each subscription key $C_i$ in operation for said service a message $M_i$ by an algorithm in which the keys $C_i$ act as parameters.

Thus, for a sevice with the subscription scheme referred to hereinbefore 22 different messages are in force at all times. The life of a message is equal to that of the service key K and for a given service there is the same number of messages as there are subscription keys being used at all times.

The calculation of the messages $M_i$ from the subscription keys $C_i$ and key K takes place in the transmission centre by means of circuit 20, organized around a micro-processor.

Such a circuit is programmed so as to realize an algorithm using the subscription keys $C_i$ (127 bits) and the service key K (56 bits) in the following way:

(1) a confusion redundancy word $\pi$ is formed which consists of 61 bits generated at random on each performance of the algorithm;

(2) $\pi^{-1}$ is calculated being the opposite to the modulo $2^{61}-1$ by an arithmetic programme using a variant of the Euclidian algorithms;

(3) a first multiplication is performed by another arithmetic programme $\nu = K\pi^{-1}$ modulo $(2^{61}-1)$;

(4) $\gamma$ is calculated, being the opposite of C modulo $2^{127}-1$, by a programme similar to that of (2);

(5) finally the message is calculated by a programme similar to (3): $M = \gamma \cdot (\nu + 2^{64} \cdot \pi)$ modulo $(2^{127}-1)$.

The programmes necessary for these calculations can be developed by a type 8080 microprocessor of the INTEL Company.

All the messages $M_i$ in force constitute the access control information associated with the broadcast service. According to the essential feature of the invention this information is broadcast by the digital data broadcasting process at circuit 22 and is restored on reception at circuit 34.

This digital data broadcasting process is known per se.

Broadcasting is performed by bringing the data into packets. Each packet occupies the active part of the television line making it possible to ensure a good compatibility with the conventional modes of use of the channel.

As in the present invention the radio channel is allocated to a television programme, only the marginal resource constituted by the field blanking interval can be used for the transmission of messages M.

In the digital broadcasting process each packet has two parts, one called the prefix and the other called the data block. The prefix is used for the management of the packet and has eight octets, two for the synchronization of the bits, one for the octet synchronization, three carry the channel code, including its protection, one carries the continuity symbol and the final octet describes the format (or length) of the data block.

The data block follows the prefix. Its maximum length is dependent upon the timing-pulse rate and the active duration of the line. The timing-pulse rate is adapted to the channel band width. The modulation used is the "non-return to zero" (NRZ) brought into a form for adapting the spectral energy distribution to the transmission channel.

When the messages $M_i$ have been transmitted and received by the digital broadcasting process it is necessary to reconstitute the service key K. This is the function of circuit 38. This circuit is programmed to develop an algorithm $K = G_{C_i}(M_i)$ field algorithm. The operations are as follows:

1. The message $M_i$ (127 useful bits) is acquired octet by octet and a multiplication by $C_i$ is carried out on the first field CG $(2^{127}-1)$. Thus a word $\mu$ is formed.

$$\mu = M \cdot C \text{ modulo } (2^{127}-1).$$

On the basis of the construction of M on transmission bits 1 to 61 of $\mu$ represent the word $\nu$, while bits 65 to 125 represent the word $\pi$. Obviously bits 62, 63, 64, 126 and 127 must be zero. If they are not zero the word $\nu$ is brought to zero before continuing the calculation.

$\pi$ and $\nu$ are multiplied on the second field CG$(2^{61}-1)$, which brings about the disappearance of the confusion redundancy and one obtains $K = \nu \cdot \pi$ modulo $(2^{61}-1)$.

A further probability test now takes place, because as K has 56 useful bits, bits 57, 58, 59, 60 and 61 must be zero. If this is not the case K is brought to zero before continuing the operation.

The 56 useful bits of K are then available in the form of 8 uneven octets.

The jamming and unjamming of the video signal taking place respectively in circuits 22 and 52 can advantageously be obtained by a process wherein the following operations are performed. The signal to be jammed is firstly sampled and then the samples are inserted in a video signal line. The n samples $V_o$ to $V_n$ constituting are permutated in circular manner by $(p+1)$ positions, so that the samples $V(p+1)$ to Vn are placed before samples $V_o$ to $V_p$, the samples are then transmitted in this permutated order. On reception the samples of the jammed signal are again circularly permutated by $(n-p)$ positions to restore the initial sequence. The number n is determined line by line, according to a law which is fixed by the transmitter and is transmitted to the receivers.

Figure 2:
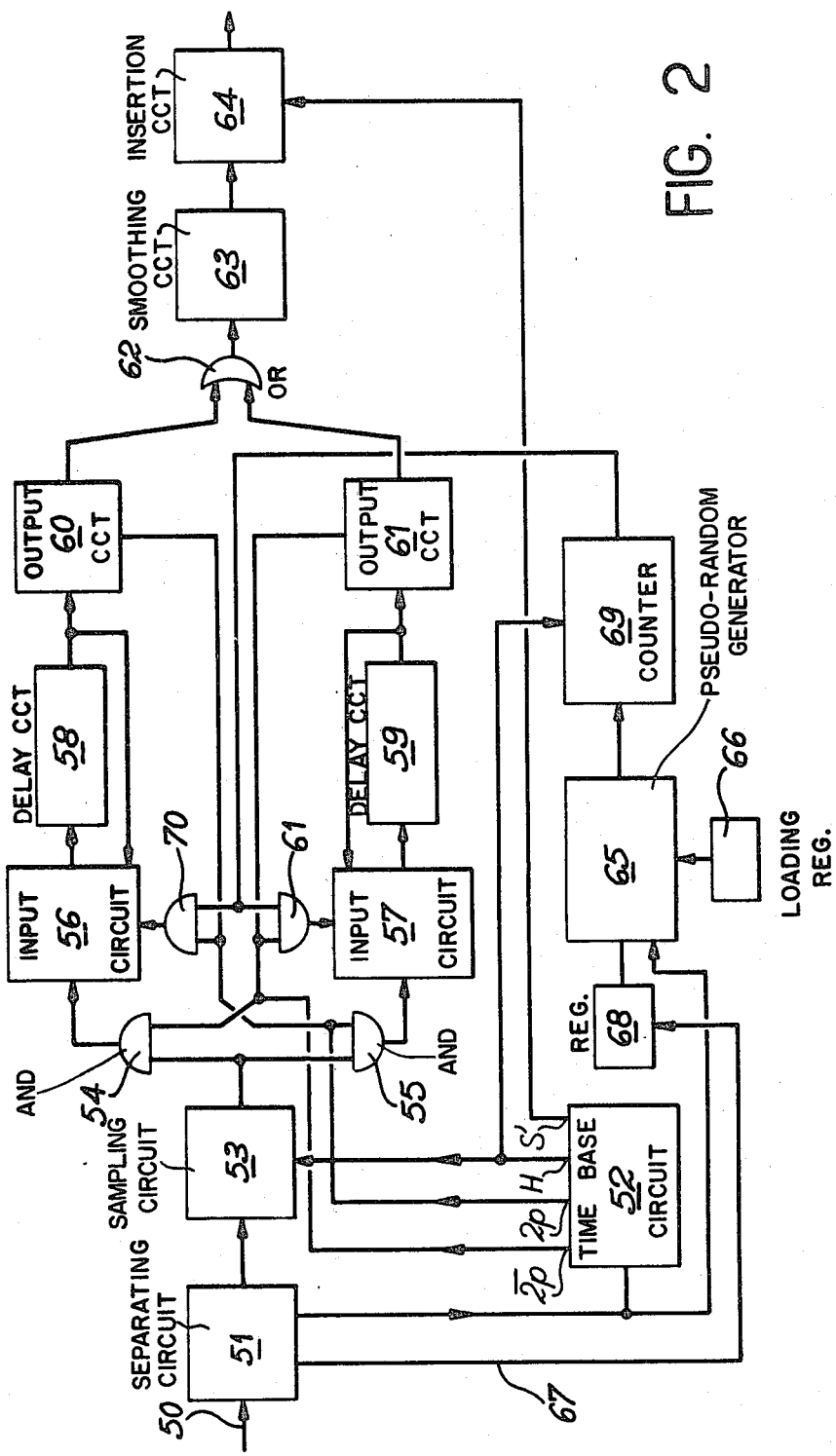
FIG. 2—diagrammatically jamming means using a circular permutation of samples.

FIG. 2 shows the block diagram of a jamming circuit which can be used in the invention. The video signal to be jammed is introduced by connection 50 into a separating circuit 51 which supplies a line synchronization pulse to a time base circuit 52 and the luminance and chrominance signals to a sampling circuit 53. In the time base circuit 52 the line synchronization pulses are used in conventional manner for generating timing signals H at the sampling frequency and line parity and imparity signals $2p$ and $\overline{2p}$ respectively. The output of the sampling circuit 53 is connected in parallel to the signal inputs of two AND gates 54 and 55, whose outputs are respectively connected to two input circuits 56 and 57. The outputs of these circuits are respectively connected to the inputs of two delay circuits 58 and 59, respectively connected to the output circuits 60 and 61. The outputs of circuits 60 and 61 are connected to the inputs of an OR gate 62, whose output is connected to the input of a smoothing circuit 63 joined to a circuit 64 in which a line synchronization pulse is inserted into the signal leaving 63.

The coder of FIG. 2 also comprises a pseudo-random digital sequence generator 65 which can be a ten-stage shift register provided with nine re-looping points, whereby there is direct re-looping between last and first stage. The eight intermediate loops are put into effective operation when a level 1 is applied to the control input of the corresponding stage. These re-looping control levels are applied from a loading register 66, which permanently contains an eight bit word. This word defines the configuration of the generator. For each field synchronization signal transmitted by the separating circuit 51 and carried by a connection 67 to a register 68 which carries a ten bit word generator 65 is initialized in accordance with this word, each stage assuming the state defined by the corresponding bit. For each field the same digital sequence of ten bits is generated with the timing of the line synchronization pulses supplied by circuit 51 to generator 65. The eight bit word contained in register 66 and the ten bit word contained in register 68 together form the axis key to the jammed transmission.

The output of generator 65 supplies a ten bit word to the initialization input of a counter 69, whose counting input receives the timing pulses H from the time base circuit 52. Counter 69 counts backwards on transmission. When counter 69 is not at zero its signal output is at level 1, but as soon as it is at zero this output passes to 0.

The second input of gate 54 is connected to an output $\overline{2p}$ of 52 in such a way that the uneven line signals transmitted by circuit 53 are transmitted to circuit 54. The second input of gate 55 is connected to the output $2p$ in such a way that the even line signals are transmitted to circuit 57.

One control input of circuit 56 is connected to the output of an AND gate 70, whose first input is connected to the output $2p$ of 53 and whose second input is connected to the output of counter 69. The control input of circuit 57 is connected to the output of an AND gate 61, whose first input is connected to output $\overline{2p}$ of 52 and whose input is connected to the output of counter 69.

The control input of circuit 60 is connected to the output 29 of 52, whilst the control input of circuit 61 is connected to output $\overline{2p}$ of 52.

Finally an input of circuit 64 is connected to an output of circuit 52 which supplies a synchronization signal S', deduced from the incoming synchronization signal.

The circuit of FIG. 2 functions as follows. During an uneven line signal $\overline{2p}$ is at the high level, gate 54 is open, circuit 60 is open towards gate 62, circuit 61 is closed and gate 55 is closed. In addition, gate 70 is closed, whilst gate 71 is open and the output of counter 69 is at high level. Thus, samples from an uneven line enter circuit 58 and jammed samples from the uneven line leave it.

During the following even line signal $2p$ is at high level, gate 51 is closed, circuit 60 is closed, circuit 61 is open and gate 55 is open. Moreover, gate 61 is closed whilst gate 60 is open and output of 69 is at high level. The first samples are transmitted to the input of 58, whilst the last are moved towards the output of 58, the content of 58 remaining unchanged until the end of the even line. Finally there is an uneven line and the operation described hereinbefore is repeated. Jamming of the even lines takes place in the same way with respect to circuit 59.

It is clear that the circuit of FIG. 2 can be used on reception for restoring the initial forms of lines by using the same circuits 66 and 68, by connecting counter 60 in such a way that after its initialization at each line by 60 it counts towards its maximum content instead of counting towards zero as was the case for the coder on transmission.

When the treated samples are in analog form, the delay circuits 58 and 59 are advantageously load transfer circuits. When the processed samples are in the coded digital form these delay circuits are shift registers.

In the described embodiment the digital signal used by the pseudo-random sequence generator contains $10+8=18$ bits, but the key can be constituted by a word having more than 18 bits, e.g. 32 bits. The 14 other bits of the key make it possible to determine which conversion functions are active and which are not (2bits), what division of the resource is chosen, what relationship exists between the 10 bits of the shift register and certain parameters of the conversions of pure delays or circular displacement. In general terms the key can carry complementary information relating to the possible configurations of the signal. This is utilised for providing the possibility of replacing a single full definition sound and video programme by four independent low definition programmes, this result being obtained by dividing up the screen space into four quadrants receiving four independent pictures obtained by reduction by digital means in the case of the video and the sound channel into four narrow band sound channels. This possibility can be provided in the definition of the jamming system. The general public receivers are not necessarily provided with these means which can be reserved for special users.

Figure 3:
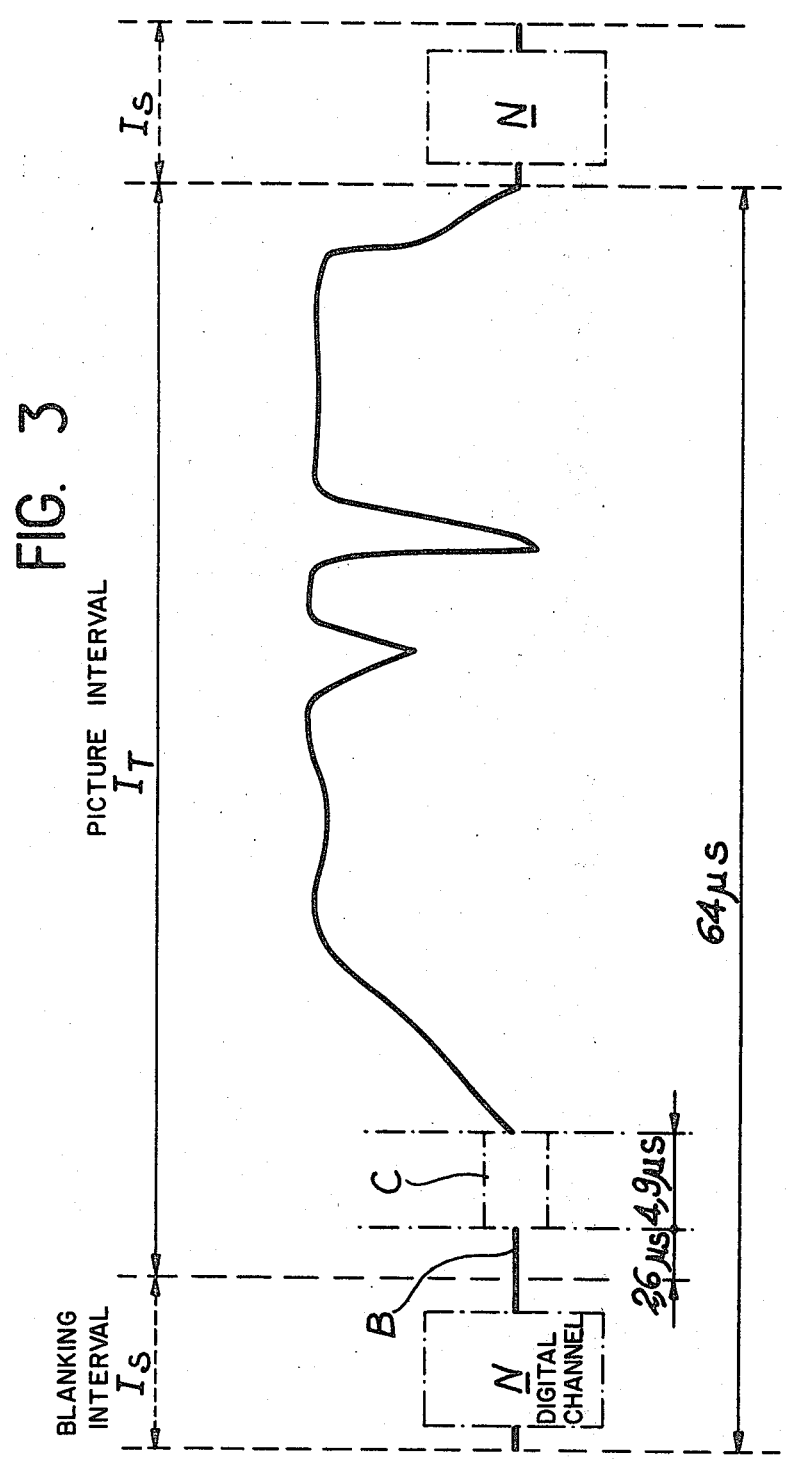
FIG. 3—the standard preferably adopted for the videosignal.

The jamming of the picture sensitizes the latter to transmission faults and makes it necessary to provide redundancies. In the video standard adopted a time interval of 2.6 μs is provided for this purpose. This interval remains free of any signal before jamming. This standard is shown in FIG. 3. Each video signal line has:

a blanking interval Is which is not affected by the pseudo-random transformations or conversions, except with regard to the content of any digital signal which may be present, said interval containing the line synchronization and optionally a digital channel N for carrying sound.

an interval $I_T$ containing the picture which is affected by the pseudo-random transformations or conversions and necessarily cntaining 7.5 μs reserved for the chrominance colour burst C (4.9 μs) and to the jamming operations (interval B of 92.6 μs), the latter margin may or may not be continuous and may be at the start or finish of lines, depending on the particular circumstances.

During the blanking of the field there is no transformation of picture space in order to retain the possibility of broadcasting data in clear in a signal whose picture and sound are jammed.

When the sound is carried by a digital channel using intervals $I_S$ or by a digital channel using the insertion of supplementary signals into the chrominance colour bursts it is sampled at one of the following frequencies which are compatible with the synchronization:

$f_0 = 7812.5$ Hz $f_1 = 15625$ Hz $f_2 = 31259$ Hz

However, as stated hereinbefore the jammed image can be accompanied by a good quality sound. In the same way it is possible to adopt a division of the capacity of the channel between at least four sounds of at least telephone quality. (300–3400 Hz, signal to noise ratio 40 dB). As stated hereinbefore the choice of the mode used can be indicated in the key word.

Figure 4:
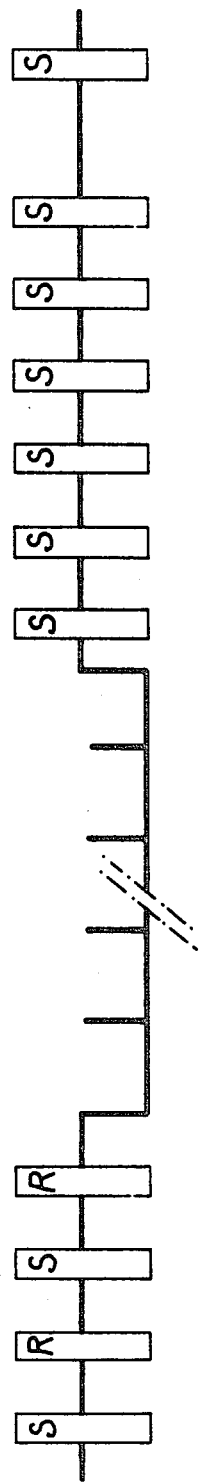
FIG. 4—diagrammatically the locations in the field synchronization signal of the signals indicating a change of key.

With regard to the change of key it is pointed out that a co-ordination system is necessary on the one hand for indicating authorized receivers which key is in service and on the other to fix the exact time, to within one field, at which one passes from one key to the next. This can be obtained by the use of:

1. messages indicative of the future key broadcast by the broadcasting system, but only interpretable by the key calculation means provided with the appropriate subscription support;

2. time marking signals inserted in a field before the change of key and as illustrated in FIG. 4.

In FIG. 4, which shows the field signal, the spaces marked S correspond to the synchronization intervals of the standard of FIG. 3 and the spaces marked R designate the intervals containing a marking indicating a change of key and which can be constituted by the bit at 1.

Figure 5:
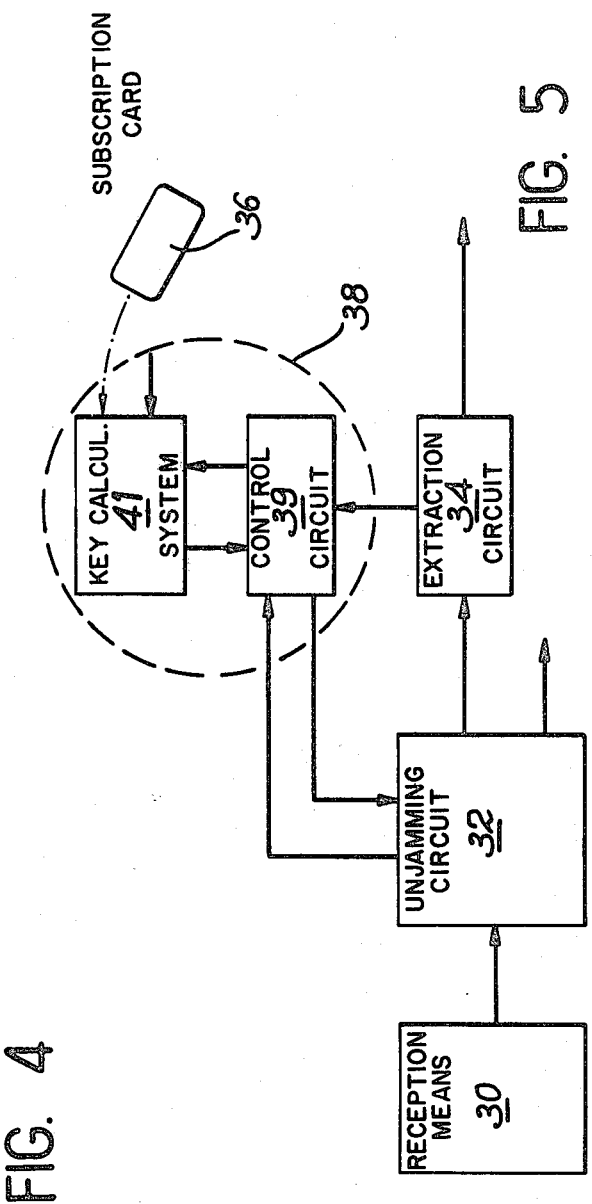
FIG. 5—the organization of the key change detection means.

The key restoration circuit 38, as shown in FIG. 1, then has in accordance with FIG. 5 a control circuit 39 connected to the key calculation system 41. This control circuit receives messages from the data extraction circuit 34, and supplies them to the key calculation circuit 41 after carrying out a possible shaping (e.g. parallel-series conversion).

Two cases must be considered for the control circuit:

on energizing the receiver it extracts a message, requests its translation from the key calculation system 41 and immediately validates this key towards the picture and/or sound unjamming means 32;

during operation the circuit listens to messages reaching it, whilst maintaining the previously calculated key in force and when the messages have a bit indicating a change of key the automaton again requests the translation thereof which restores the future key K' and as from this time the circuit awaits a key change pulse to replace the old key K by the new key K'.

What is claimed is:

1. A television system with access control constituted by a transmitter and receivers, the transmitter comprising a circuit for the formation of a video signal organized in lines and fields and a sound signal, a transmission means for said signals and a jamming circuit using a service key K, said jamming circuit receiving the video and/sound signal and supplying jammed video and/sound signals which are then transmitted to the transmission means, each receiver comprising a reception means for the transmitted signals, means for the display of a picture and for the restoration of sound and an unjamming circuit connected to the reception means and working with said service key K, said unjamming circuit supplying unjammed video and optionally sound signals which are then transmitted to the means for the display of the picture and the restoration of the sound, wherein it also comprises:

(A) a subscription management center comprising means for generating a plurality of digital signals constituting subscription keys $C_i$ changing in random manner at relatively long intervals of approximately one month;

(B) in the transmitter:

(a) a generator of a digital signal constituting the the service key K which changes in random manner at relatively short intervals of approximately a few minutes, (b) a circuit for the formation of digital messages $M_i$ obtained from the subscription keys $C_i$ and the service key K by an algorithm parametered by the subscription keys, i.e. $Mi = F_{C_i}(K)$, said circuit supplying the same number of messages as there are subscription keys and these messages change with the service key, (c) a data broadcasting system able to insert messages Mi in the field blanking intervals of the video signal, jamming not affecting the messages contained in the field blanking interval;

(C) in each receiver:

(a) a subscription card on which is entered a signal corresponding to at least one of the subscription keys $C_i$, (b) a circuit for the extraction of the data contained in the signal received and which restores the messages Mi, (c) a circuit for the restoration of the service key receiving on the one hand messages Mi supplied by the preceding circuit and on the other hand the subscription key Ci supplied by the subscription card, said circuit performing an algorithm $K = G_{Ci}(Mi)$ which makes it possible to restore the signal corresponding to the service key K used in the transmitter;

(d) at least one subscription card loading station which is connected to the subscription management center from which it receives the signals corresponding to the different subscription keys Ci generated by the center, each station being able to temporarily receive the subscription cards and write therein one of the subscription keys Ci.

2. A television system according to claim 1, wherein:

(A) the jamming circuit comprises:
  (a) a pseudo-random sequence generator re-initialized at each start of the field by the service key K and which supplies at the start of each line a digital jamming signal;
  (b) a circuit for the transformation or conversion of the video and optionally sound signal, the transformation carried out by this circuit being defined by the digital signal supplied by the pseudo-random sequence generator;

(B) the unjamming automaton comprises:
  (a) a pseudo-random sequence generator identical to that of the jamming automation and which, like it, is re-initialized at each start of the field by the service key K and which supplies at the start of each line a digital unjamming signal,
  (b) a circuit which is able to carry out on the video and optionally sound signals the opposite transformation or conversion to that of the jamming automaton, said transformation being determined by the digital unjamming signal supplied by the pseudo-random sequence generator.

3. A television system according to claim 1, wherein the service key contains bits indicating the means used for transmitting sound.

4. A television system according to claim 1, wherein the transmitter comprises a means for generating time marking signals inserted in a field and which indicate a change of service key and wherein the receiver comprises means for detecting said marking signals, starting the investigation of a future service key K', and maintaining said future key on hold.

5. A television system according to claim 4, wherein each message comprises a bit indicating the change of key in the transmitter, the corresponding key change taking place in the receivers as soon as the bit is detected.

* * * * *